(12) United States Patent
Shin et al.

(10) Patent No.: US 8,143,771 B2
(45) Date of Patent: Mar. 27, 2012

(54) FILTER AND DISPLAY DEVICE HAVING THE SAME

(75) Inventors: Dong Keun Shin, ChungCheongNam-Do (KR); Dae Chul Park, ChungCheongNam-Do (KR); Dong Hyun Park, ChungCheongNam-Do (KR); Sang Yoon Oh, ChungCheongNam-Do (KR); Moon Jin Choi, ChungCheongNam-Do (KR); Hwa Yeon Lee, ChungCheongNam-Do (KR)

(73) Assignee: Samsung Corning Precision Materials Co., Ltd. (KR)

( * ) Notice: Subject to any disclaimer, the term of this patent is extended or adjusted under 35 U.S.C. 154(b) by 15 days.

(21) Appl. No.: 12/481,711

(22) Filed: Jun. 10, 2009

(65) Prior Publication Data
US 2009/0310212 A1 Dec. 17, 2009

(30) Foreign Application Priority Data

Jun. 11, 2008 (KR) .................. 10-2008-0054616
Jun. 3, 2009 (KR) .................. 10-2009-0049099

(51) Int. Cl.
*H01J 5/16* (2006.01)

(52) U.S. Cl. ........... 313/112; 313/582; 252/587; 445/24

(58) Field of Classification Search .............. 313/112, 313/582; 445/24; 252/587
See application file for complete search history.

(56) References Cited

U.S. PATENT DOCUMENTS

| 6,429,587 B1 * | 8/2002 | Sugimachi et al. ........... 313/582 |
| 6,965,191 B2 * | 11/2005 | Koike et al. .................. 313/112 |
| 2004/0160183 A1 * | 8/2004 | Kim ............................. 313/582 |
| 2008/0297021 A1 * | 12/2008 | Hwang et al. ................ 313/112 |

FOREIGN PATENT DOCUMENTS

| KR | 20060076092 A | 7/2006 |
| KR | 20060100989 A | 9/2006 |
| KR | 20060113147 A | 11/2006 |

OTHER PUBLICATIONS

English Translation of Hong, KR 10-2006-0113147, published Nov. 2, 2006.*

* cited by examiner

*Primary Examiner* — Nimeshkumar Patel
*Assistant Examiner* — Mary Ellen Bowman
(74) *Attorney, Agent, or Firm* — Lerner, David, Littenberg, Krumholz & Mentlik, LLP (57) ABSTRACT

A filter for a display device includes a base substrate, a shielding film formed based on a single transparent base layer, and an adhesive layer adhering the shielding film onto the base substrate. The shielding film which realizes diverse shielding functions in a single sheet is adhered onto the base substrate through a single process, which serves to improve productivity, reduce manufacturing cost, restrain the occurrence of Haze and improve visibility.

16 Claims, 7 Drawing Sheets

FILTER AND DISPLAY DEVICE HAVING THE SAME

CROSS-REFERENCE TO RELATED APPLICATION

This application claims the benefit of Korean Patent Application No. 2008-0054616 filed on Jun. 11, 2008, in the Korean Intellectual Property Office, and Korean Patent Application No. 2009-0049099 filed on Jun. 3, 2009, in the Korean Intellectual Property Office; the disclosures of which are incorporated herein by reference.

BACKGROUND OF THE INVENTION

1. Field of the Invention

The present invention relates to a filter for a display device, and more particularly, to a filter for a display device in which diverse functions are realized in a single sheet to improve visibility and productivity, and a display device having the same.

2. Description of the Related Art

As information is getting more important in the modern society, remarkably advanced image display devices and their parts are being distributed. The display devices include display devices for TVs, monitors of personal computers (PCs) and so on, and their distribution is greatly increasing. Further, the display devices are getting larger in a screen size and thinner at the same time.

In general, a plasma display panel (PDP) device is in the limelight as a next generation display device since it can be made larger in a screen size and thinner at the same time than a cathode ray tube (CRT), which is representative of existing display devices. The PDP device displays an image using a gas discharge phenomenon and has an excellent display performance in relation to a luminance, a contrast ratio, an image retention, a viewing angle, or the like. Further, the PDP device is in the spotlight as a display device which can replace the CRT device because the PDP device can be easily made larger in a screen size than other display devices and as a thinner image display device, the PDP device has the most suitable characteristics for future high quality digital televisions.

The PDP device applies a direct or alternating voltage to the electrodes to cause gas discharge and then ultraviolet radiation. The ultraviolet activates a fluorescent layer to generate light. However, the PDP device has drawbacks that electromagnetic interference (EMI), near infrared rays (NIR), and neon light of orange color are generated. The EMI is harmful to the human body, the NIR causes malfunction of precision appliances such as a remote controller, and the neon light deteriorates color purity.

Therefore, the PDP device employs a PDP filter in order to block electromagnetic waves and near infrared rays, reduce reflection, and improve color purity.

Figure 1:
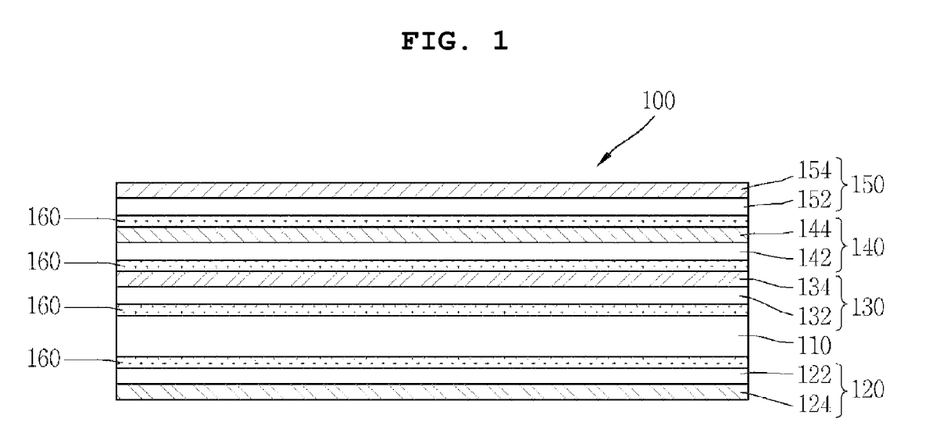
FIG. 1 is a cross-sectional view illustrating a filter for a display device according to a related art.

FIG. 1 is a cross-sectional view illustrating a conventional filter for a display device.

The filter 100 includes a structure in which a transparent substrate 110, an electromagnetic shielding film 120, a neon light shielding film 130, a near-infrared shielding film 140 and an anti-reflection film 150 are laminated on one another.

That is, the electromagnetic shielding film 120 is laminated on one side of the transparent substrate 110, and the neon light shielding film 130, the near-infrared shielding film 140 and the anti-reflection film 150 are laminated in the order named on the other side of the transparent substrate, using an adhesive layers.

In detail, each film has a multi-layered structure consisting of a transparent base layer and a functional layer laminated thereon, wherein the electromagnetic shielding film 120 includes a transparent base layer 122 and an electromagnetic shielding layer 124 laminated thereon, the neon light shielding film 130 includes a transparent base layer 132 and a neon light shielding layer 134 laminated thereon, the near-infrared shielding film 140 includes a transparent base layer 142 and a near-infrared shielding layer 144 laminated thereon, and the anti-reflection film 150 includes a transparent base layer 152 and an anti-reflection layer 154 laminated thereon.

Such a filter for a display device requires the transparent base layer 122, 132, 142 or 152 for the respective functional films such as the electromagnetic shielding film, the neon light shielding film, the near-infrared shielding film, the anti-reflection film, and the like, which are laminated on the transparent base substrate using an adhesive layer. Accordingly, the manufacturing process becomes complicated and thus the productivity decreases and the manufacturing costs increases.

Moreover, since in the filter, a plurality of functional films is laminated, it is difficult to sufficiently restrain the occurrence of Haze, and thus the visibility deteriorates.

SUMMARY OF THE INVENTION

The present invention has been made to solve the foregoing problems with the related art, and therefore one or more objects of the present invention are directed to provide a filter for a display device in which diverse functions are realized in a single sheet, which serves to greatly reduce the number of manufacturing processes, improve the productivity and reduce a manufacturing cost.

One or more objects of the present invention are directed to provide a filter for a display device in which the number of layers is minimized, which serves to sufficiently restrain the occurrence of Haze, and thus improve visibility.

One or more objects of the present invention are directed to provide a method of manufacturing a filter for a display device in which the filter is manufactured by a single process, which serves to shorten the process time.

In an exemplary embodiment of the invention, the filter for a display device includes a base substrate, a shielding film formed based on a single transparent base layer, and an adhesive layer adhering the shielding film onto the base substrate.

In an exemplary embodiment of the invention, a ground bar for grounding an electromagnetic shielding layer is provided on the base substrate. The ground bar may be a conductive metal tape or may be made of conductive metal paste.

In an exemplary embodiment of the invention, the shielding film includes a transparent base layer, a near-infrared shielding layer formed on one surface of the transparent base layer, and an electromagnetic shielding layer formed on the other surface of the transparent base layer.

In an exemplary embodiment of the invention, the near-infrared shielding layer contains a hard coating material and/or a color compensating material.

In an exemplary embodiment of the invention, the electromagnetic shielding layer is composed of a conductive mesh pattern or a conductive film.

In an exemplary embodiment of the invention, the adhesive layer contains a conductive material.

In an exemplary embodiment of the invention, a method of manufacturing a filter for a display device includes the steps of forming a plurality of shielding layers on a single transparent base layer so as to form a shielding film and adhering, through a single roll to roll process, the shielding film onto the base substrate using an adhesive layer containing a conductive material.

In an exemplary embodiment of the invention, the step of forming the shielding film includes preparing the transparent base layer, forming a near-infrared shielding layer on one surface of the transparent base layer and forming an electromagnetic shielding layer on the other surface of the transparent base layer.

In an exemplary embodiment of the invention, the method further includes the steps of forming an anti-reflection layer on a surface of the near-infrared shielding layer.

According to the above-described structures, the filter for a display device is configured such that the single sheet of the shielding film, in which the near-infrared shielding layer and the electromagnetic shielding layer are respectively formed on opposite surfaces of the transparent base layer, is adhered onto the base substrate using the adhesive layer, which serves to greatly reduce the number of manufacturing processes, improve the productivity and reduce the manufacturing costs.

Further, diverse kinds of functional layers are formed based on the single transparent base layer to minimize the number of films in the filter, which serves to sufficiently restrain the occurrence of Haze and improve visibility.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EXEMPLARY EMBODIMENT

The present invention will now be described more fully hereinafter with reference to the accompanying drawings, in which exemplary embodiments thereof are shown.

Figure 2:
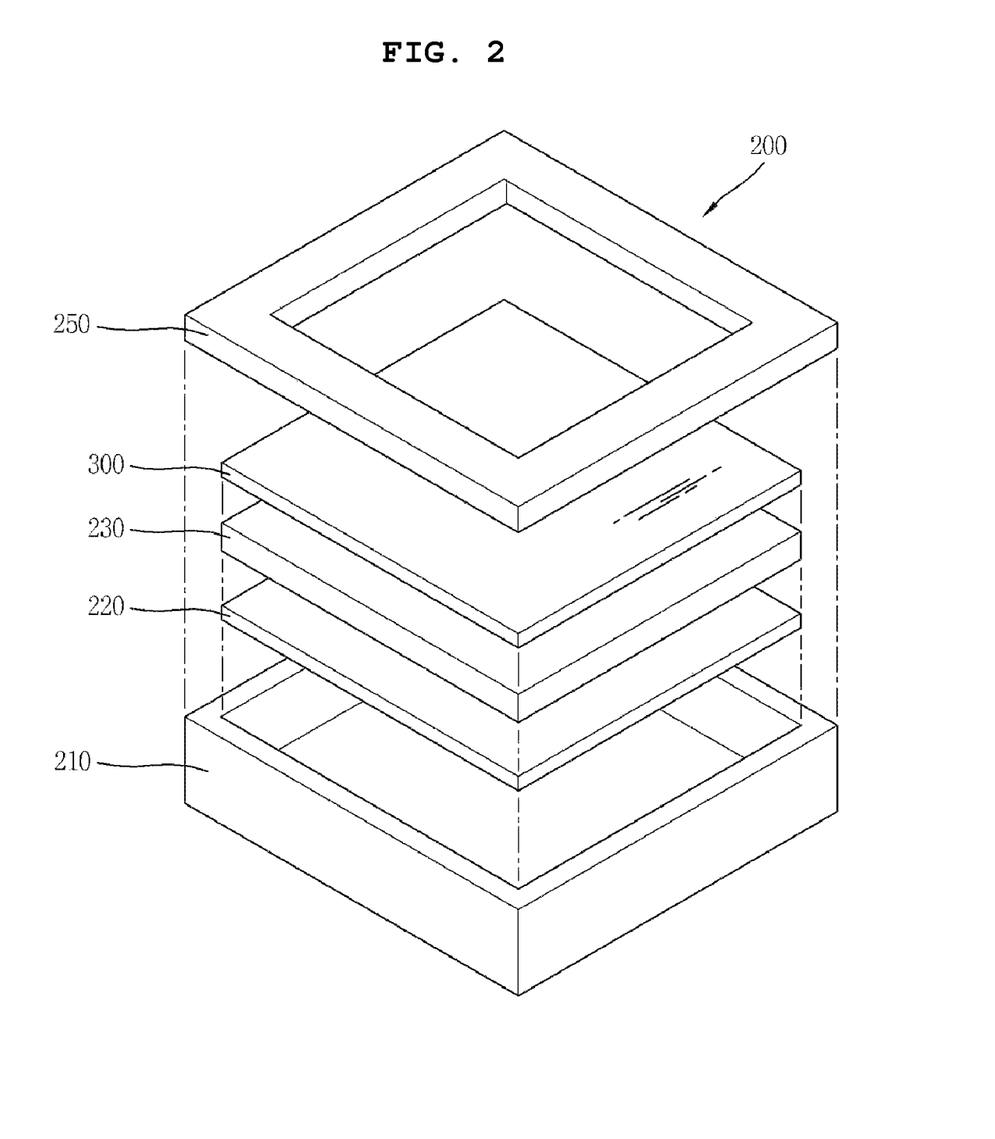
FIG. 2 is an exploded perspective view illustrating a display device according to a first embodiment of the present invention.

FIG. 2 is an exploded perspective view illustrating a display device according to a first embodiment of the present invention.

As illustrated in FIG. 2, the display device 200 includes a case 210, a cover 250 covering an upper portion of the case 210, a drive circuit board 220 received in the case 210, a display panel 230 including discharge cells, in which a gas discharge phenomenon occurs, and a filter 300.

Figure 3:
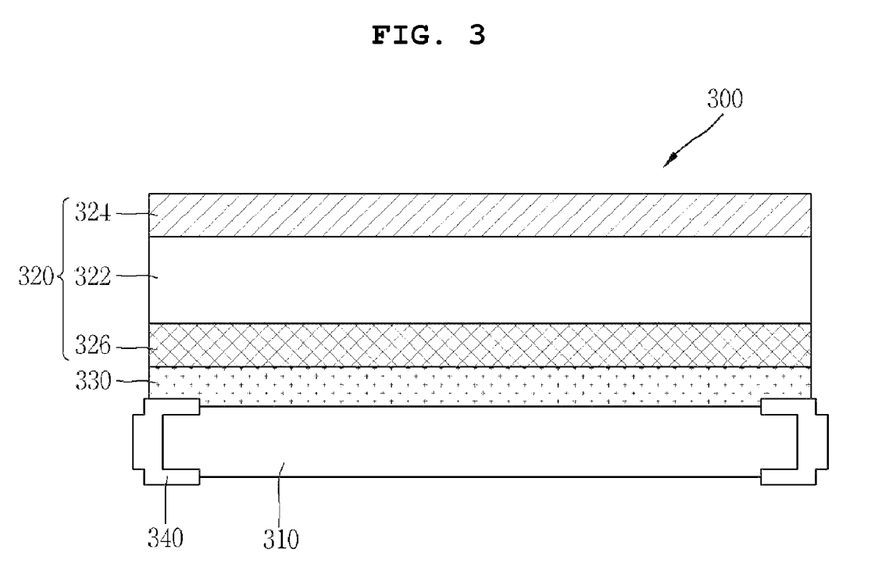
FIG. 3 is a cross-sectional view illustrating a filter for a display device according to the first embodiment of the present invention.

As illustrated in FIG. 3, the filter 300 according to the first embodiment of the invention includes a base substrate 310, a shielding film 320 formed on the base substrate 310 and having a single transparent base layer which performs a multi-function of shielding electromagnetic waves and near-infrared rays, correcting colors or the like, and an adhesive layer 330 adhering the shielding film 320 onto the base substrate 310.

The filter 300 of the embodiment can be manufactured by a single process in which the shielding film 320 performing diverse shielding functions which is supported by the single transparent base layer is adhered onto the base substrate 310, which serves to greatly simplify the manufacturing process and thus, improve productivity.

The base substrate 310 is made of tempered or heat-strengthened glass or a transparent plastic material such as acryl. While glass has drawbacks in that it has heavy specific gravity of 2.6 and thick thickness and thus makes the display device heavy, it serves to prevent a burst and scattering and a deterioration due to heat from the PDP panel after being used for a long time.

In an embodiment of the invention, the base substrate 310 may be composed of an inorganic compound such as glass, quartz, etc., or a transparent organic polymer material. The organic polymer material may be more preferable because it is light and hard to break.

The base substrate 310 is typically composed of acryl or polycarbonate but the present invention is not limited thereto. The base substrate may be a substrate of polymer or a multi-layered substrate of polymer. In the base substrate 310, it is preferable that transmittance of visible light is 80% or more in terms of the transparency and glass transition temperature is 60° C. or more in terms of the heat resistance. The polymer material has to transmit visible light, and may be composed of polyethylene terephthalate (PET), polysulfone (PS), polyether sulfone (PES), polystyrene, polyethylene naphthalate, polyarylate, polyether ether ketone (PEEK), polycarbonate (PC), polypropylene (PP), polyimide, triacetylceluose (TAC), polymethyl methacrylate (PMMA), etc., but the present invention is not limited thereto. Among them, polyethylene terephthalate (PET) is preferable from the viewpoints of a price, heat resistance and transparency.

A ground bar 340 is provided on the base substrate 310 in order to ground the electromagnetic shielding layer 326 of the shielding film 320 to the case 210.

That is, electromagnetic waves emitted from a display panel are trapped by the electromagnetic shielding layer 326 of the shielding film 320 before reaching a viewer, and then are grounded to the case via the ground bar 340.

The ground bar 340 may be a metal tape with high conductivity, or may be made by applying metal paste of copper or silver powders. The metal tape may be made of copper, silver or any other metallic material having excellent conductivity.

In the case of rear grounding type in which electromagnetic waves are grounded via the rear face of the filter, the ground bar extends from the front surface through the side surface to the rear surface of the base substrate. That is, in the rear grounding type, the ground bar 340 is formed in such a manner that the metal tape is attached in a clamp-like shape onto the side surface of the base substrate 310 as illustrated in FIG. 3. In this case, as the base substrate, annealed glass can be used, which serves to advantageously reduce a material cost. However, the present invention is not limited to the above-mentioned structure and diverse ground bars other than the metal tape can be used even in the rear grounding type.

In the case of front grounding type, copper or silver powders may be applied in a paste state onto the front surface of the base substrate 310.

The shielding film 320 includes a transparent base layer 322, on which diverse shielding layers are laminated, a near-infrared shielding layer 324 laminated on one side of the base layer 322, and an electromagnetic shielding layer 326 laminated on the other side of the base layer 322.

The transparent base layer 322 serves to support the respective shielding layers, and is preferably made of a transparent resin. The transparent base layer 322 may be composed of, for example, polyethylene terephthalate (PET), polycarbonate (PC), polyvinylchloride (PVC) or the like.

The near-infrared shielding layer 324 may be formed directly on the surface of the transparent base layer 322 by means of the die-coating of near-infrared dyes or pigments.

The near-infrared shielding layer 324 serves to block strong near-infrared rays, which are emitted from the display panel 230 and cause malfunction of electric appliances such as wireless phones, remote controllers or the like. In addition, the near-infrared shielding layer 324 can be made of polymer resin containing a near-infrared absorbing material which can absorb light having wavelengths of near-infrared region in order to block near-infrared rays emitted from the display panel 230. For example, as the near-infrared absorbing material, various organic pigments such as a cyanine type, an anthraquinone type, a naphtoquinone type, a phthalocyanine type, a naphthalocyanine type, a diimonium type, a nickel dithiol type, or the like may be used.

Such a near-infrared shielding layer 324 may contain a hard coating material to prevent a scratch. That is, the near-infrared shielding dye or pigment is mixed with the hard coating material and the mixture can be applied onto the surface of the transparent base layer 322.

The near-infrared shielding layer 324 may be formed as a separated layer as described above, or may be formed as a hybrid functional layer such that the near-infrared absorbing material is added to the adhesive layer 330.

The electromagnetic shielding layer 326 can typically use a conductive mesh pattern or a multilayered transparent conductive film in which a metal film and a high-refractive transparent film are laminated on each other. Here, the conductive mesh pattern may generally use a metal mesh, a metal-coated synthetic resin mesh or a metal-coated metal fiber mesh. Any metal with good conductivity and machinability, for example, copper, chrome, nickel, silver, molybdenum, tungsten, aluminum, or the like can be used.

The electromagnetic shielding layer of a transparent conductive film type can use a high-refractive transparent film such as an Indium Tin Oxide (ITO) film to block electromagnetic waves.

In the electromagnetic shielding layer of the multilayered transparent conductive film type, a metal film of Au, Ag, Cu, Pt, Pd, etc. and a high refractive transparent film of indium oxide, tin dioxide, zinc oxide, etc. may be alternately laminated on each other.

In an embodiment of the invention in which as the electromagnetic shielding layer 326, the multilayered transparent conductive film is used, it serves to block near-infrared rays. Thus, in this case, the electromagnetic shielding layer 326 can perform two functions of blocking both near-infrared rays and electromagnetic waves without the above-mentioned separate near-infrared shielding layer 324. Of course, even in this case, the near-infrared shielding layer 324 may also be provided.

In an embodiment of the invention in which as the electromagnetic shielding layer 326, the conductive mesh pattern is used, the filter can use polymer resin containing a near-infrared absorption material which can absorb light having wavelengths of near-infrared region in order to block near-infrared rays emitted from a display panel. As the near-infrared absorption material, diverse organic absorption materials, such as a cyanine type absorption material, an anthraquinone type absorption material, a naphtoquinone type absorption material, a phthalocyanine type absorption material, a naphthalocyanine type absorption material, a diimonium type absorption material, a nickel dithiol type absorption material, etc. may be used.

The adhesive layer 330 is provided to adhere the above-mentioned shielding film 320 onto the base substrate 310. Acrylic adhesives, silicone adhesives, urethane adhesives, polyvinyl butylal adhesives (PMB), ethylene-vinyl acetate (EVA) adhesives, polyvinyl ether, saturated amorphous polyester, melamine resin or the like may be used.

The adhesive layer 330 may contain a conductive material which allows the electromagnetic shielding layer 326 to be electrically connected with the ground bar 340, which provides a transmission path of electromagnetic waves.

That is, the adhesive layer 330 containing the conductive material comes into contact with both the electromagnetic shielding layer 326 and the ground bar 340. Electromagnetic waves are trapped by the electromagnetic shielding layer 326 and are grounded to the case 210 via the adhesive layer 330 and the ground bar 340. The adhesive layer 330 containing the conductive material is applied to cover the ground bar and the electromagnetic shielding layer is electrically connected to the ground bar via the adhesive layer.

In an embodiment in which the adhesive layer does not contain the conductive material, the adhesive layer is applied such that the ground bar is exposed (see FIG. 6), and the ground bar is brought into direct contact with the electromagnetic shielding layer. That is, the adhesive layer is not applied on an area where the ground bar is formed, thereby preventing the adhesive layer from interfering with the electrical connection between the ground bar and the electromagnetic shielding layer.

The adhesive layer 330 may contain a color compensating colorant which reduces or controls the amount of light of red (R), green (G) and/or blue (B) to change or correct a color balance.

Generally, visible light of red color emitted from plasma in a display panel tends to exhibit orange color. A conventional filter is provided with a separate color compensating film to correct the orange color having a wavelength ranging from 580 nm to 600 nm into red color. However, according to an embodiment of the present invention, an adhesive layer may be made to perform a color compensating function by absorbing the orange color having a wavelength of 580~600 nm. In such an embodiment, the function of the color compensating layer of correcting orange color into red color can be reduced or the color compensating layer may be excluded.

That is, the color compensating layer of the embodiment of the invention may be provided as a separate layer, or may be provided as a hybrid functional layer by adding the color compensating colorant to the adhesive layer which adheres the shielding film onto the base substrate.

As the color compensating colorant, various colorants, namely dyes or pigments can be used to increase a range of the color reproduction of display and degree of definition. An organic colorant having a function of blocking neon light, such as anthraquinone dye, cyanine dye, azo dye, styryl dye, phthalocyanine dye, methyl dye, or the like may be used. Since the sort and concentration of the colorants are determined by an absorption wavelength and an absorption coefficient of the colorant, and a transmittance required for a display filter, they are not limited to specified values.

The color compensating colorant may be added to the near-infrared shielding layer 324 instead of the adhesive layer 330.

Figure 4:
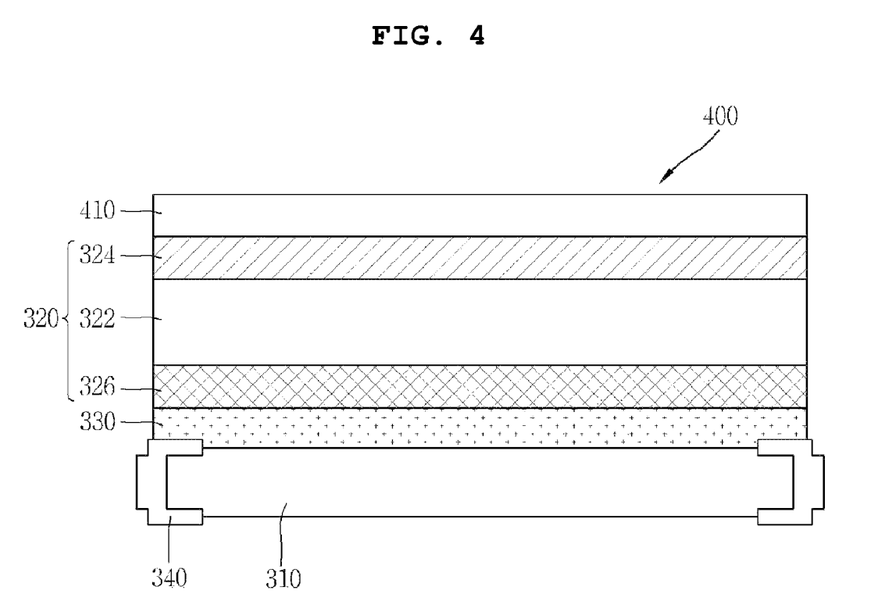
FIG. 4 is a cross-sectional view illustrating a filter for a display device according to a second embodiment of the present invention.

FIG. 4 is a cross-sectional view illustrating a filter for a display device according to a second embodiment of the invention.

The filter 400 for a display device of the embodiment further includes an anti-reflection layer 410.

The anti-reflection layer 410 is formed on a surface of the near-infrared shielding layer 324. The anti-reflection layer 410 is advantageously formed on the surface of the near-infrared shielding layer facing a viewer when the filter 400 is mounted in a display device, i.e. the surface opposite to the display panel 230. Such an anti-reflection layer 410 can reduce the reflection of external light to improve visibility.

Of course, the anti-reflection layer 410 may also be formed on the surface of the filter 400 facing the display panel 230 to further reduce the reflection of light. Such structure of the anti-reflection layer serves to improve transmittance of visible light from the display panel 230 and a contrast ratio. The anti-reflection layer 410 may be formed on the surface of the near-infrared shielding layer 324 by applying, printing or diverse known film-forming methods of the related art.

In detail, the anti-reflection layer 410 may consist of a thin film of fluoric transparent polymer resin, magnesium fluoride, silicone resin, silicon oxide, etc, a refractive index of which is 1.5 or less, preferably 1.4 or less in a visible range. Such an anti-reflection layer may have the thickness of e.g. a quarter of a wavelength of light. The anti-reflection layer 220 may include two or more thin films (layers) of an inorganic compound, such as metal oxide, fluoride, silicide, boride, carbide, nitride, sulfide, etc., or an organic compound, such as silicone resin, acryl resin, fluoric resin, etc, refractive indexes of which films are different from each other.

Here, while the single-layered anti-reflection layer 410 can be easily fabricated, it has lower anti-reflectivity than the multi-layered anti-reflection layer. The multi-layered anti-reflection layer has anti-reflectivity over a wide range of wavelength. Such an inorganic compound film may be formed by means of a conventional known method such as sputtering, ion-plating, ion beam-assist, vacuum vapor deposition, wet coating, or the like, and such an organic compound film may be formed by means of a conventional known method such as wet coating or the like.

For example, the anti-reflection layer 410 according to an embodiment of the invention may have a structure in which a low reflective oxide film such as $SiO_2$ and a high reflective oxide film such as $TiO_2$ or $Nb_2O_5$ are alternately laminated. Such oxide films may be formed by means of physical vapor deposition or wet coating.

Figure 5A:
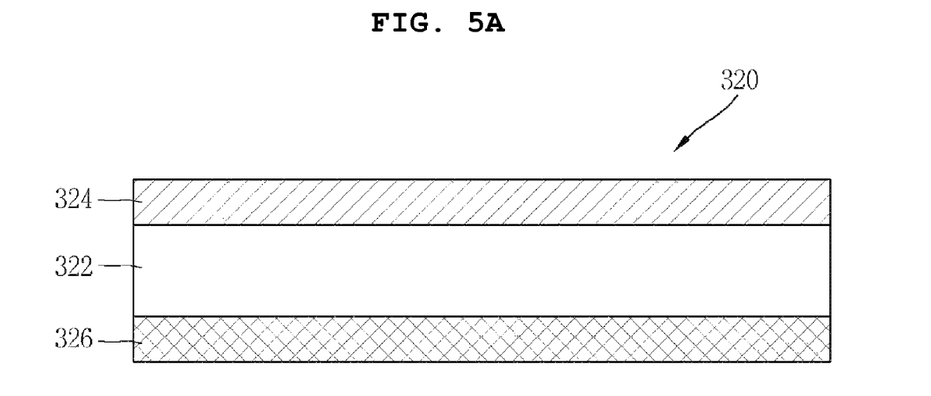
FIGS. 5A to 5C are views illustrating a process procedure of manufacturing the filter according to the second embodiment of the present invention.
Figure 5B:
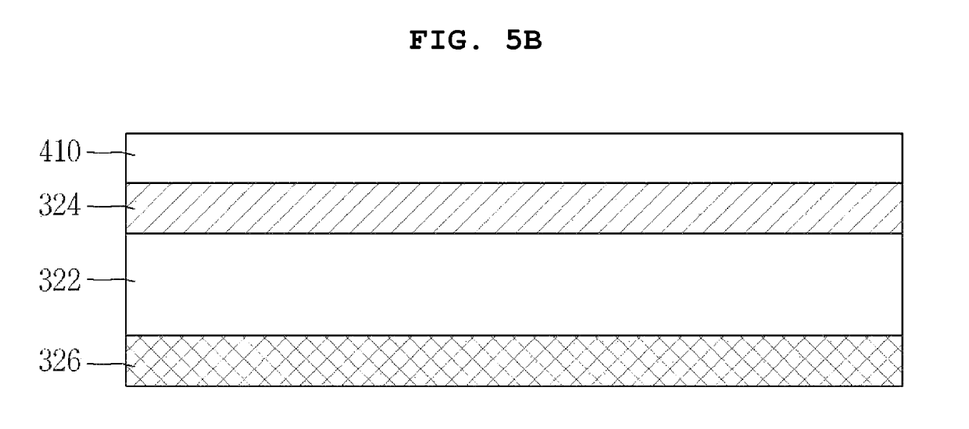
Figure 5C:
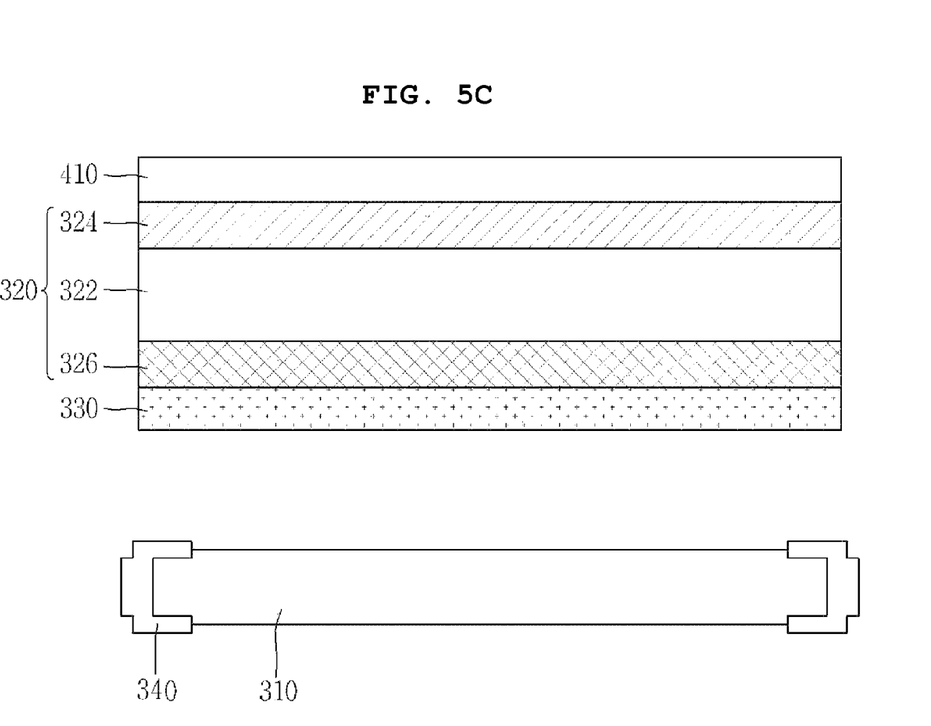

FIGS. 5A to 5C are views illustrating a process procedure of manufacturing the filter for a display device according to the second embodiment of the present invention.

First, as illustrated in FIG. 5A, the shielding film 320 is manufactured. That is, the near-infrared shielding layer is formed on one side of the transparent base layer 322, and the electromagnetic shielding layer 326 is formed on the other side of the base layer.

A mixture of a near-infrared absorbing dye or pigment and transparent resin is coated onto the one side of the transparent base layer 322. Here, a color compensating colorant can be further added in addition to the near-infrared absorbing dye or pigment. A conductive mesh pattern or a multi-layered transparent conductive film including a metal thin film and a high-reflective transparent thin film is formed on the other side of the transparent base layer 322.

Next, as illustrated in FIG. 5B, the anti-reflection layer 410 can be formed on a surface of the near-infrared shielding layer 324 to reduce reflection of external light. In some cases, the anti-reflection layer 410 may be excluded.

Finally, as illustrated in FIG. 5C, the resulting shielding film is adhered, through a single roll to roll process, onto a surface of the base substrate 310 using the adhesive layer 330, whereby the filter for a display device is obtained.

Here, the adhesive layer 330 contains conductive material which allows the electromagnetic shielding layer 326 to be electrically connected with the ground bar 324 provided on the base substrate 310 to form a transmission path of electromagnetic waves. Further, the adhesive layer 330 may contain a color compensating colorant. The color compensating colorant may be included in any one of near-infrared shielding layer and the adhesive layer.

Figure 6:
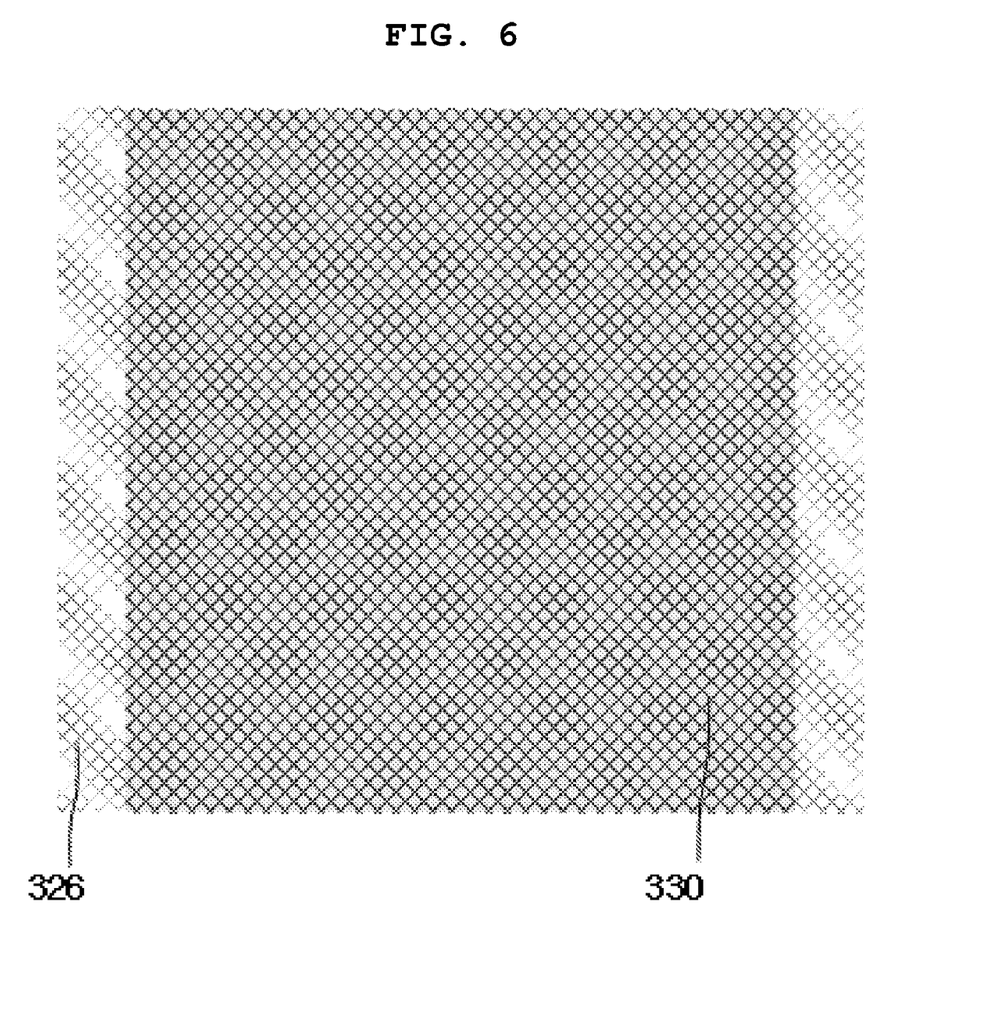
FIGS. 6 and 7 are views illustrating shielding films according to a third embodiment and a fourth embodiment, respectively as viewed from the rear direction.
Figure 7:
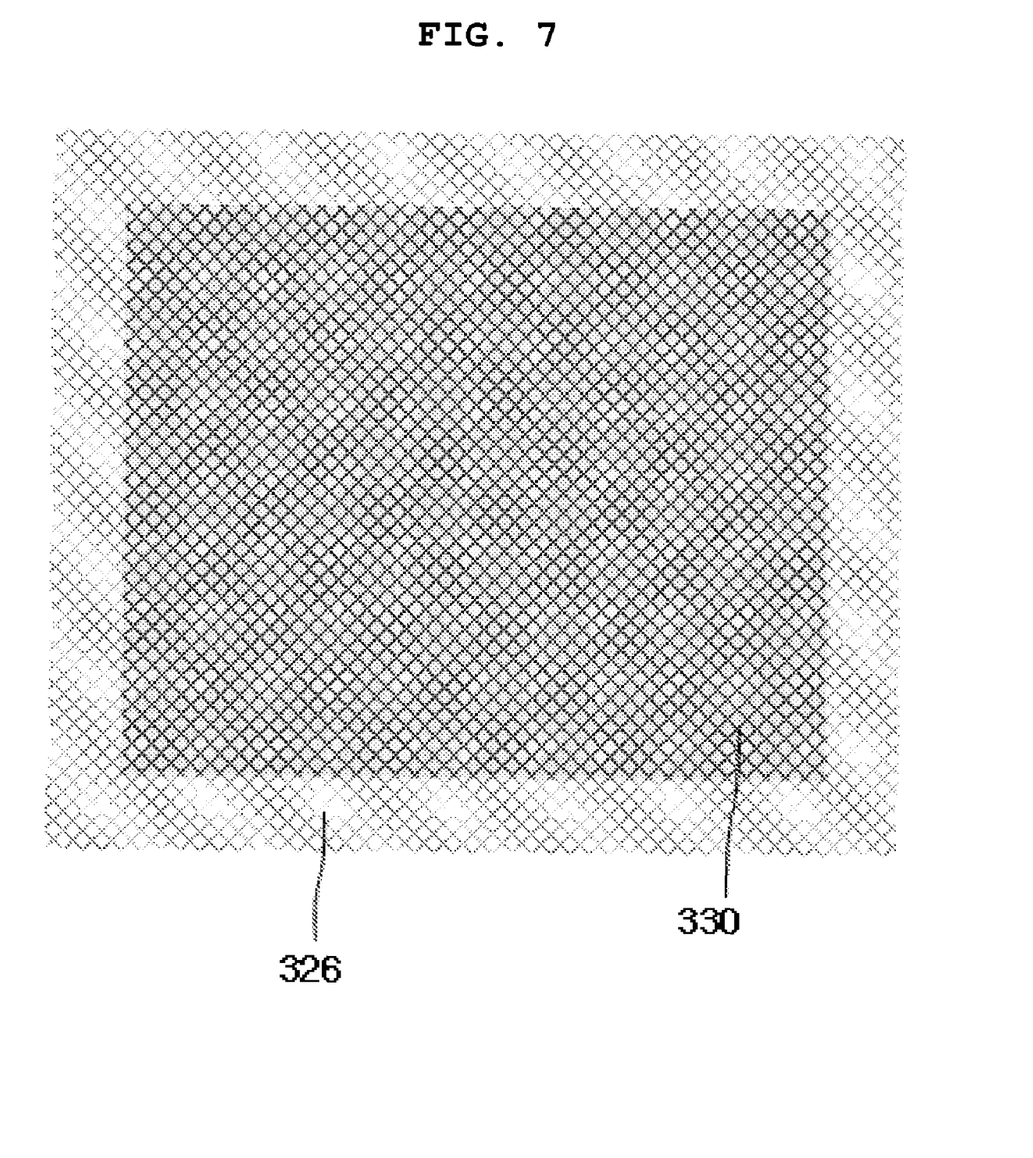

FIGS. 6 and 7 are views illustrating shielding films according to a third embodiment and a fourth embodiment, respectively as viewed from the rear direction.

An adhesive layer may be formed in such a manner that a ground bar is exposed to allow an electromagnetic shielding layer to come into direct contact with the ground bar. The adhesive layer as shown in FIG. 6 is suitable for the ground bar formed along two sides of the base substrate. The adhesive layer as shown in FIG. 7 is suitable for the ground bar formed along four sides of the base substrate.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A filter for a display device, the filter comprising:
a base substrate and a shielding film adhered onto a first surface of the base substrate by an adhesive layer,
wherein the shielding film includes a single transparent base layer and is provided as a single sheet supported by the single transparent base layer, and the shielding film includes an electromagnetic shielding layer on one surface of the transparent base layer facing the first surface of the base substrate, the adhesive layer interposed between the first surface of the base substrate and one surface of the electromagnetic shielding layer facing the first surface of the base substrate,
a ground bar is provided on the first surface of the base substrate facing the one surface of the electromagnetic shielding layer to ground the electromagnetic shielding layer, and
the ground bar extends from the first surface of the base substrate facing the one surface of the electromagnetic shielding layer through a side surface of the base substrate to a second surface of the base substrate facing away from the first surface of the electromagnetic shielding layer.

2. The filter for a display device according to claim 1, wherein the first surface of the base substrate is a front surface of the base substrate.

3. The filter for a display device according to claim 2, wherein the ground bar is a conductive metal tape, and the base substrate is an annealed glass.

4. The filter for a display device according to claim 1, wherein the adhesive layer is applied in such a manner that the ground bar is exposed to come into direct contact with the one surface of the electromagnetic shielding layer.

5. The filter for a display device according to claim 1, wherein the adhesive layer contains a conductive material and is applied in such a manner that the ground bar is covered with the adhesive layer to be electrically connected to the electromagnetic shielding layer through the adhesive layer.

6. The filter for a display device according to claim 1, wherein the electromagnetic shielding layer is a conductive film which is coated directly onto the one surface of the transparent base layer.

7. The filter for a display device according to claim 1, wherein the electromagnetic shielding layer is a conductive mesh pattern formed directly on the one surface of the transparent base layer.

8. The filter for a display device according to claim 7, wherein the adhesive layer contains a near-infrared absorbing material.

9. The filter for a display device according to claim 7, wherein the shielding film includes a near-infrared shielding layer on the other surface of the transparent base layer facing away from the electromagnetic shielding layer.

10. The filter for a display device according to claim 9, wherein an anti-reflection layer is laminated on one surface of the near-infrared shielding layer facing away from the electromagnetic shielding layer.

11. The filter for a display device according to claim 9, wherein the near-infrared shielding layer contains a hard coating material.

12. The filter for a display device according to claim 9, wherein the near-infrared shielding layer contains a color compensating material.

13. The filter for a display device according to claim 1, wherein the shielding film includes a hard coating layer on the other surface of the transparent base layer, the other surface facing in a front direction.

14. The filter for a display device according to claim 1, wherein the transparent base layer is made of a transparent resin.

15. The filter for a display device according to claim 1, wherein the adhesive layer contains a color compensating material.

16. A display device comprising:
a display panel displaying an image; and
the filter as recited in claim 1.

* * * * *